United States Patent

Healey et al.

[15] 3,651,470
[45] Mar. 21, 1972

[54] INTEGRATED LEVEL DETECTOR CIRCUIT WITH GATING ARRANGEMENT TO INHIBIT TRANSIENT OUTPUT SIGNALS IN RESPONSE TO ENERGIZATION OF THE CIRCUIT

[72] Inventors: Robert Joseph Healey, Morris Township, Morris County; Joseph Plany, Parsippany, both of N.J.

[73] Assignee: Bell Telephone Laboratories, Incorporated, Murray Hill, N.J.

[22] Filed: June 8, 1970

[21] Appl. No.: 44,159

[52] U.S. Cl. ............................................340/172, 340/169
[51] Int. Cl. ..................................................H04q 1/00
[58] Field of Search ..........................................340/172, 169

[56] References Cited

UNITED STATES PATENTS

| | | | |
|---|---|---|---|
| 2,934,708 | 4/1960 | Stuntz | 340/172 X |
| 3,134,054 | 5/1964 | Cronier et al. | 340/169 X |
| 3,158,838 | 11/1964 | Gilbert | 340/172 |
| 3,289,193 | 11/1966 | Worthington | 340/172 X |
| 3,339,180 | 8/1967 | Garfield | 340/169 |
| 3,346,846 | 10/1967 | Ferguson | 340/172 |
| 3,400,219 | 9/1968 | Jahns et al. | 340/169 X |
| 3,506,967 | 4/1970 | Foley | 340/172 |

*Primary Examiner*—Harold I. Pitts
*Attorney*—R. J. Guenther and E. W. Adams, Jr.

[57] ABSTRACT

A level detector circuit suitable for embodiment in integrated circuit form includes a comparator circuit and reference voltage generator energized by a common voltage source. The level detector monitors the voltage of an incoming signal by utilizing the comparator circuit to compare this signal with the generated reference voltage. The reference voltage is generated in response to a current source energizing a breakdown diode. The output of the comparator is temporarily inhibited during the transient initial energization of the comparator and the reference voltage generator to prevent false alarm signals. The output is inhibited by an inhibit gate circuit arrangement which is energized by a driving circuit operative prior to breakdown of the breakdown diode. An additional feature of the invention is a signal inversion scheme energized by the reference voltage generator which permits voltages of opposite polarity to that of the reference and energization voltages to be compared with the magnitude of the reference voltage by the comparator.

4 Claims, 4 Drawing Figures

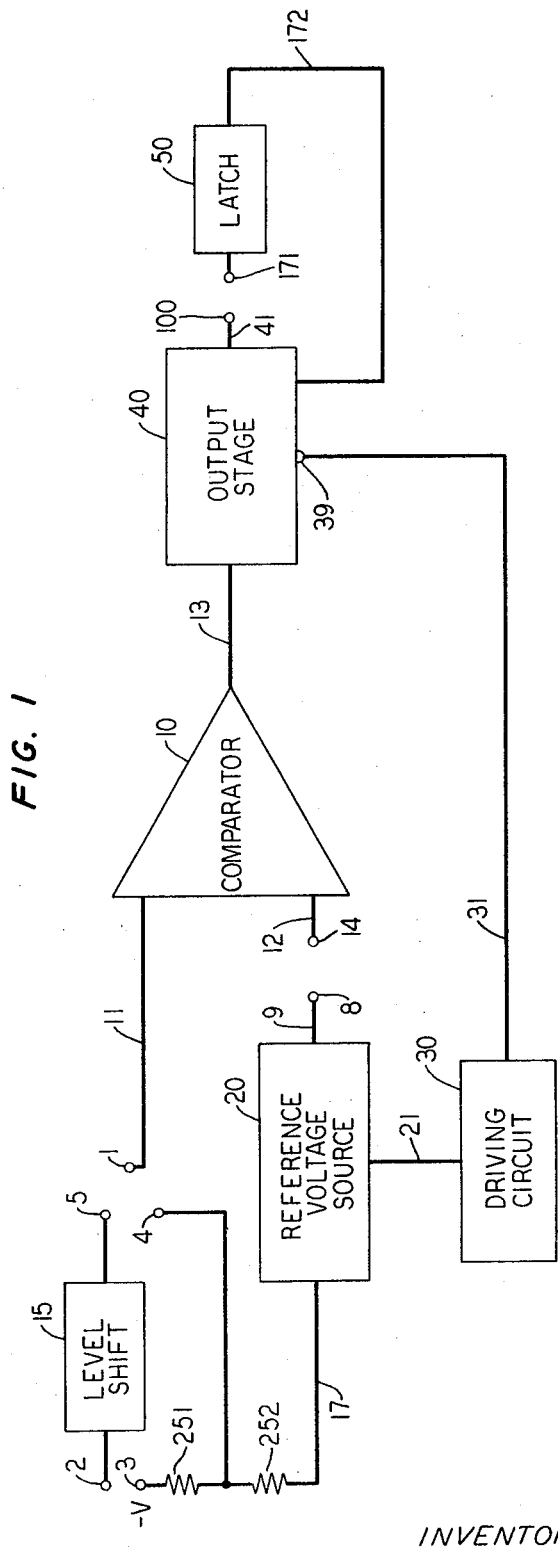
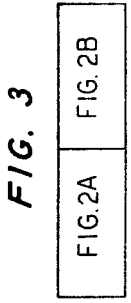

INTEGRATED LEVEL DETECTOR CIRCUIT WITH GATING ARRANGEMENT TO INHIBIT TRANSIENT OUTPUT SIGNALS IN RESPONSE TO ENERGIZATION OF THE CIRCUIT

FIELD OF THE INVENTION

This invention relates to signal level detector circuits and more particularly to a signal threshold monitoring circuit suitable for functioning as an alarm indicator in power conditioning circuitry. The level detector circuit of the invention is specifically designed to permit its complete embodiment in the integrated circuit form.

BACKGROUND OF THE INVENTION

Level detector or threshold monitoring circuits are utilized to indicate when an arbitrary incoming signal or waveform applied to the detector attains some reference amplitude level. Changes in the signal being monitored, increasing or decreasing its amplitude across some threshold level, may indicate a malfunction condition in the electrical system to which the level detector is coupled. When the amplitude of the incoming signal exceeds this predetermined threshold, the level detector circuit generates an output signal which is a large departure from its normal output signal state. This generated output signal occurs at the same time that the input signal attains or exceeds the predetermined threshold level. Most level detectors operate by comparing the amplitude of the incoming signal with the amplitude of a reference signal which establishes the threshold level. The application of a level detector is normally limited to monitoring incoming signals having the same polarity as the reference and energization signals.

Level detectors are suitable for monitoring the continuous satisfactory operation of power conditioning systems of utility networks. These level detectors may be located at remote stations of the network and be coupled to transmitting equipment to transmit the alarm signal generated to some central control location. The remote level detector may be operated only periodically instead of continuously in order to conserve power. The transmission of an alarm signal in response to the level detector is cause for remedial measures to be taken to correct a malfunction in the network. In periodic operation of the level detector, the energization of the level detector circuit may haphazardly generate a false alarm signal. Since the level detector as indicated may be located in a remote location, it is desirable that the level detector signal output be responsive only to the amplitude of the input signal attaining or exceeding a predetermined threshold. Adequate protection against false generation of alarm signals during energization of the level detector requires that the protection circuitry be fully operative while the level detector is being energized into an operative condition. Once the level detector is operative the protection circuitry must become inoperative to permit the level detector to operate. To conserve power it is desirable that the level detector and protection circuitry be energized by a common source.

It is therefore an object of the invention to monitor signal levels of both polarities with an integrated circuit level detector energized by an energization signal of one polarity.

It is another object of the invention to prevent a level detector from generating false alarm signals in response to energization of the level detector.

SUMMARY OF THE INVENTION

Therefore, in accord with the present invention, the above objects are achieved with a level detector designed to monitor signal amplitudes of both polarities, and including a protection arrangement to inhibit the generation of alarm signals during its energization. The level detector monitors the amplitude of an incoming voltage signal by utilizing a comparator circuit to compare the signal voltage amplitude with a reference signal voltage amplitude. The reference voltage is generated in response to a current source energizing a breakdown diode. The output of the comparator is temporarily inhibited during the transient initial energization of the comparator and the reference voltage generator to prevent the generation of false alarm signals. The circuit arrangement to prevent generation of false alarm signals is energized by a driving circuit operative subsequent to initial application of energization to the level detector and prior to the breakdown of the breakdown diode.

An additional feature of the level detector according to the invention is a signal inversion scheme energized by the reference voltage generator which permits voltage signals of opposite polarity to that of the reference and energization signal to be compared with the magnitude of the reference voltage by the comparator.

An advantage of the level detector according to the invention is that it is designed to permit its complete realization in monolithic integrated circuit form. Hence, all the advantages attendant to the monolithic integrated circuit form accrue to the level detector.

DESCRIPTION OF THE DRAWINGS

Many other objects, advantages and features of the invention will become apparent from the following detailed description of a specific embodiment of the invention when read in conjunction with the appended drawings wherein FIG. 1 is a block diagram of a level detector in accord with the principles of the invention;

FIG. 3 is a diagram showing the connection of FIGS. 2A and 2B.

DETAILED DESCRIPTION

Figure 2A:
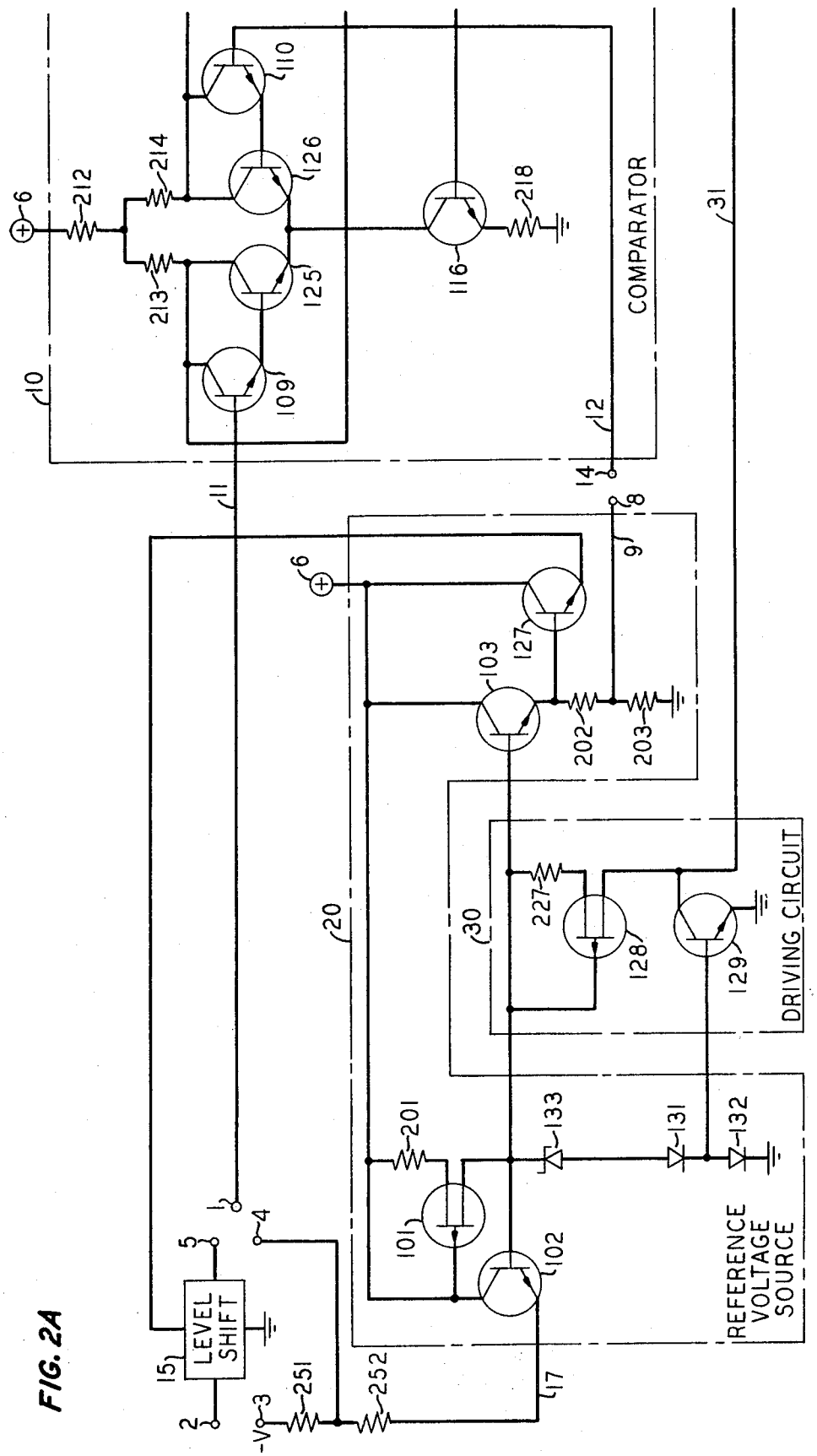
FIGS. 2A and 2B when combined are a schematic diagram of the level detector disclosed in FIG. 1.

The level detector disclosed in the block diagram in FIG. 1 monitors the voltage amplitude of an input signal applied to one of the input terminals 1, 2 or 3. The level detector responds to a certain threshold level of the applied input signal and produces an output signal at terminal 100 whenever the amplitude of the applied input signal equals or exceeds this threshold level. The level detector includes circuitry to generate a reference voltage signal to establish the threshold voltage at which the level detector responds to the applied input signal being monitored.

The amplitude and polarity of the applied input signal to be monitored determines the selection of the input terminal to which it is applied. Input signals of normal amplitude and the same polarity as that of the signal source energizing the level detector are applied to the input terminal 1 and from there, via lead 11, to the comparator circuit 10. Input signals having an opposite polarity to that of the signal source energizing the level detector are applied to the input terminal 3. Input terminal 3 is connected, via a voltage divider comprising the resistors 251 and 252, to the reference voltage source 20 which establishes a reference voltage at output lead 17 to energize the voltage divider. Hence a voltage of the same polarity as the voltage energizing the level detector 20 and inversely proportional to the magnitude of the input voltage at terminal 3 is taken from the voltage divider at terminal 4. Terminal 4 is connected to the input lead 11 of the comparator 10, via terminal 1. The output state of the comparator 10 will be inverted with respect to the magnitude of the input voltage at terminal 3. The inversion of the output state of the comparator 10 may be avoided by connecting input terminal 4 to terminal 14 of lead 12 and connecting the reference voltage of lead 9 at terminal 8 to the input terminal 1.

Input signals having a very small amplitude are applied to input terminal 2 which is connected to a level shift circuit 15. The level shift circuit 15 increases the amplitude of the input signal to a level which permits it to be compared with the amplitude of the reference signal generated by the reference voltage source 20. The level shifter 15 is connected to the input lead 11 of the comparator 10 by connecting terminal 1 to the terminal 5.

The comparator 10 compares the magnitude of the input signal voltage on input lead 11 with the reference magnitude of the reference signal voltage on lead 9 which is connected to lead 12 by coupling terminals 8 and 14. The output of the comparator 10 has two stable states. The output changes state whenever the magnitude of the input signal voltage crosses the reference magnitude level of the reference signal voltage. In the illustrative embodiment when the input signal voltage on lead 11 is lower in amplitude than the reference signal voltage on lead 12, the output of the comparator 10 on lead 13 will be representative of a zero. When the input signal voltage on lead 11 exceeds the amplitude of the reference signal voltage on lead 12, the output of the comparator 10 on lead 13 will be representative of a one. This comparator output signal on lead 13 is applied, via an output stage 40 and lead 41, to the output terminal 100. The output terminal 100 may be connected to the terminal 171 which is connected to the latch circuit 50 which, in response to a one signal, applies a feedback signal, via lead 172, to the output stage 40 to lock its output state into a one condition.

The reference signal source 20 is coupled, via lead 21, to a driving circuit 30. The driving circuit 30 in response to the initial transient energization of the reference voltage source 20 generates an inhibit signal. This inhibit signal is applied, via lead 31, to the inhibit input 39 of the output stage 40. This inhibits the output stage 40 from transmitting the output signals of the comparator 10 to output terminal 100 during this transient energization of the level detector circuit. This advantageously prevents false alarm signals from being generated.

Figure 2B:
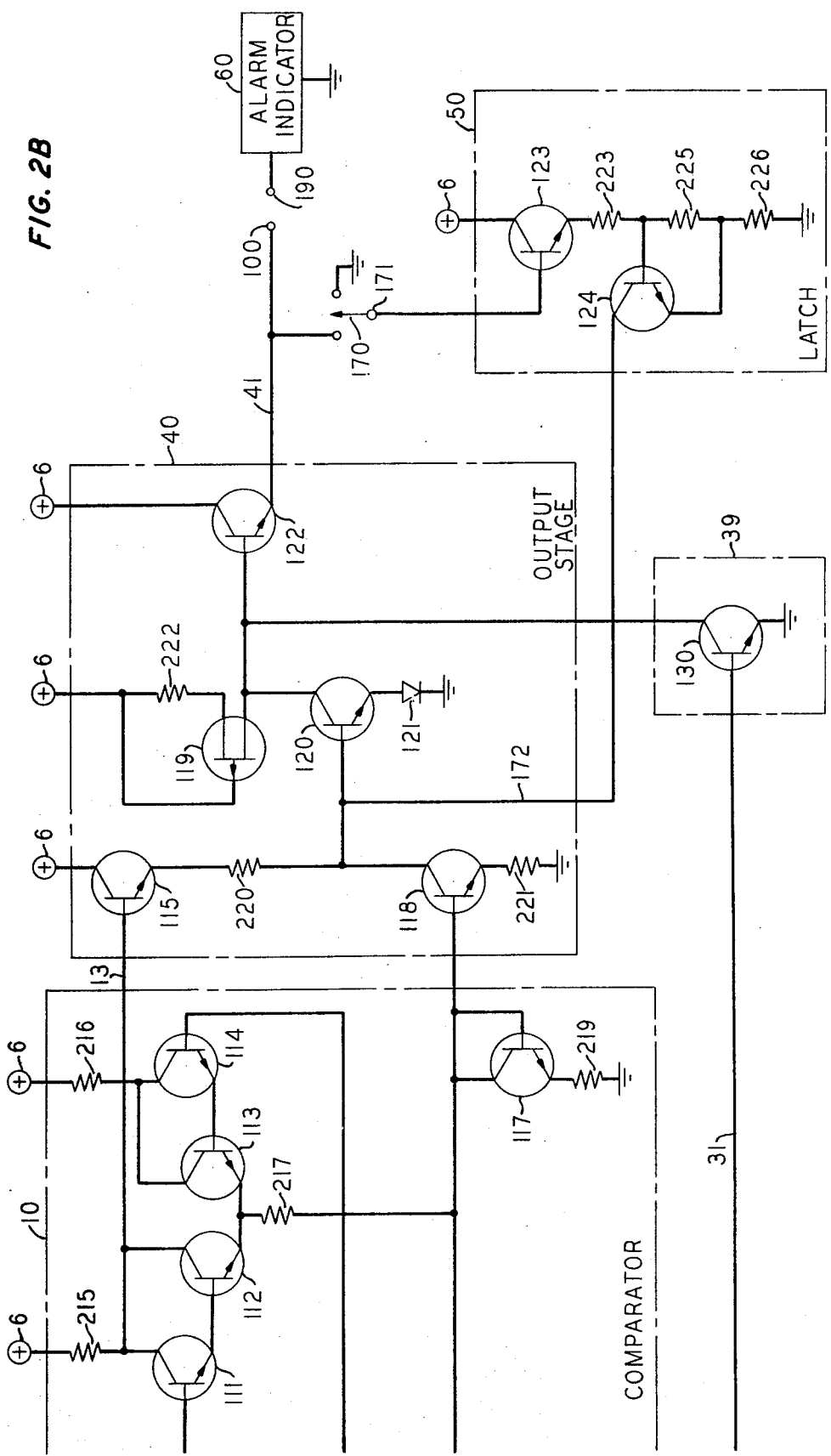

The schematic diagram shown in FIGS. 2A and 2B, positioned as shown in FIG. 3, discloses in greater detail the level detector circuit depicted in block diagram in FIG. 1. The identical components in FIG. 2 are identified with the same reference numerals being used to identify these components in FIG. 1. The input signal voltage to be monitored is applied as described above to one of the input terminals 1, 2, or 3 depending respectively on the polarity and magnitude of the input signal voltage. Positive signals having a normal amplitude with respect to the reference signal are applied via terminal 1 to the input lead 11 of the comparator 10. Signals having a very small amplitude are applied to input terminal 2 of the level shift circuit 15 which in turn is coupled, via terminals 5 and 1, to the input lead 11 of the comparator 10. The level shift circuit 15 amplifies signals having small amplitudes to permit low level signals to be monitored by the detector. Input signals of a negative polarity are applied to the input terminal 3. The terminal 3 is coupled to the voltage divider comprising the series connected resistors 251 and 252. The voltage divider is coupled to the reference voltage source 20 via lead 17. This arrangement, whose operation is described below, inverts the signal to a positive polarity. This positive signal at terminal 4 is coupled, via terminal 1, to the lead 11 of the comparator 10. The reference signal at terminal 8 with which these input signals are compared is generated by the reference voltage source 20 and applied to lead 12 of the comparator 10 by coupling terminals 8 and 14.

The invention may be readily understood by describing the operation of the illustrative embodiment. All of the components of the level detector are energized by a common direct current voltage source 6. The reference voltage is derived from the voltage source 6. This voltage source 6 energizes the constant current field effect transistor 101 in the reference voltage source 20. The field effect transistor 101 supplies a direct current to bias the avalanche breakdown diode 133 into its breakdown region. The fixed voltage drop due to the breakdown of the breakdown diode 133 is coupled to the base electrode of the transistor 103. The transistor 103, energized by voltage source 6, supplies a current to a voltage divider comprising the series connected resistors 202 and 203. The voltage at the center node of the voltage divider comprises the reference voltage and is applied, via coupled terminals 8 and 14, to the input lead 12 of the comparator 10.

The breakdown voltage of the avalanche breakdown diode 133 is also utilized to bias the transistor 102 into conduction. The transistor 102 derives a constant positive voltage from the voltage source 6 and applies it to the voltage divider comprising the series connected resistors 251 and 252. Transistor 102 in combination with the series connected resistors 251 and 252 as described above inverts the input signal polarity. This signal inverting scheme permits the monitoring of negative signal voltages by the comparator 10 without changing the energizing voltage and semiconductor polarities of the component devices.

The negative voltage to be monitored is applied to input terminal 3. A fixed positive voltage controlled by transistor 102 is applied to the voltage divider. The current transmitted by the voltage divider to the negative voltage applied on terminal 3 generates a positive voltage at terminal 4 whose amplitude is inversely proportional to the amplitude of the negative signal applied to terminal 3. The output amplitude of the comparator 10 is inverted with respect to the amplitude of the negative signal. The output amplitude may be maintained in phase with the negative input amplitude at terminal 3 by applying the reference voltage to terminal 1 and connecting terminal 4 to terminal 14.

The energizing signal applied to the level shifter 15 is derived from the reference voltage source 20. This arrangement derives a lower voltage than that of the source 6 for use in the level shifter 15 to limit power dissipation therein. This energizing signal is derived from the transistor 103. The emitter electrode of transistor 103 is coupled to the base of transistor 127 whose collector-emitter path is coupled to the DC source 6. The collector-emitter impedance of the transistor 127 interconnects the voltage source 6 to the level shift circuit 15 and hence regulates the amplitude of the supply voltage applied thereto.

The signal voltage level, whose threshold is being monitored, is applied to the comparator 10, via lead 11. The comparator 10 comprises two differential amplifier stages connected in a series configuration. The differential amplifiers operate in the conventional mode. Under normal operating conditions, the amplitude of the input signal voltage applied to lead 11 is below the amplitude of the reference signal voltage applied to lead 12. The Darlington type connected transistors 109 and 125 in response to the low voltage input signal applied to the base of transistor 109 are in a low conduction state. The higher amplitude of the reference signal applied by lead 12 to the base of transistor 110 biases the Darlington type connected transistors 110 and 126 into a high conduction state. The common collector voltage of transistors 110 and 126 is at a low voltage value. This collector voltage is applied to the base of transistor 111 biasing the Darlington coupled transistors 111 and 112 into a low conduction state. The collector voltage of transistors 111 and 112 hence is at a high voltage value. The transistors 114 and 113, coupled via their base electrodes, to the high collector voltage of transistors 109 and 125 are in a high conduction state and their common collector voltage is at a low voltage value. The high common collector voltage of transistors 111 and 112 is applied to the base electrode of transistor 115 and biases it into a high conduction state.

The current traversing the collector-emitter path of transistor 115 is applied, via resistor 220, to the collector of transistor 118. Transistor 118 is biased by the constant voltage drop across transistor 117 and resistor 219 and hence draws a constant current. When the magnitude of the current traversing the collector-emitter path of transistor 115 exceeds the current drain capacity of transistor 118, the current in excess of this capacity is applied to the base of transistor 120, biasing it into a high conduction state. The collector-emitter path of transistor 120 is coupled to the transconductive path of the field effect transistor 119. The current in the field effect transistor 119 is regulated at a constant magnitude by the bias resistor 222. When the transistor 120 is fully conducting, it absorbs all of the current supplied by the field effect transistor 119. Hence, the transistor 122 which normally receives its biasing current from transistor 119 is biased into a nominal conduction state. Hence, it is apparent that under normal voltage conditions the output voltage of the level detector on lead 100 is in a low voltage state.

When the amplitude of the signal voltage applied to lead 11 exceeds the amplitude of the reference voltage on lead 12, the high voltage on lead 11 biases the Darlington type connected transistors 109 and 125 into a high conduction state. The common low collector voltage of transistors 109 and 125 is coupled to the base of the Darlington type connected transistors 113 and 114 and biases these transistors into their low conduction state. The amplitude of reference voltage is less than that of the input voltage, hence the reference voltage applied to lead 12 biases the transistors 126 and 110 into a low conduction state relative to the conduction state of transistors 125 and 109. The high collector voltage of transistors 126 and 110 biases the transistors 111 and 112 into a high conduction state. The collector voltage of transistors 111 and 112 applied to the base of transistor 115 is at a relatively low value and hence the conduction state of transistor 115 is reduced to a low level. The current flow through the collector-emitter path of transistor 115 is low. The current requirements of transistor 118 absorb all of this current and no current is available to bias the transistor 120 into conduction. With transistor 120 nonconducting the entire current supplied by the field effect transistor 119 is applied to the base of transistor 122 biasing it into a conducting condition. The emitter voltage of transistor 122 appearing on lead 100 is at a high voltage level. An optional alarm indicator 60 may be coupled to the output of the output stage 40 by coupling the terminal 100 to the terminal 190.

Since many overvoltage conditions raising the amplitude of the input signal above the threshold level may be temporary, it is sometimes desirable that the signal output of the output stage 40 give a continuous indication after the overvoltage condition has subsided. In the illustrative embodiment, continuity of the alarm signal applied to the alarm indicator 60 may be achieved by means of the latch circuit 50 which, when connected, locks the output of the comparator 10 into a high voltage state upon the occurrence of an overvoltage or alarm condition. The latch circuit 50 comprises a pair of transistors 123 and 124 which lock into a conducting state in response to a high output voltage on lead 100. The base of the transistor 123 is connected to the switch 170 which is external to the integrated circuitry. In the operating condition for the latch circuit 50 the switch 170 is connected to the output terminal 100. When an alarm condition occurs the high level voltage output on lead 100, applied via switch 170, to the base of transistor 123 biases it into its conducting state. The high conducting state of transistor 123 applies a current, via resistor 223, to the base of transistor 124 which biases it into its conducting state. The collector of transistor 124 is coupled to the base electrode of transistor 120 and in its conducting state drains the base drive current from transistor 120. Hence, during and subsequent to an alarm condition, the transistor 120 is maintained in its nonconducting state. With transistor 120 in a nonconducting condition, the current output of the field effect transistor 119 is applied to transistor 122 maintaining the high voltage output of the level detector. Once the alarm condition has been noted, the latch circuit 50 may be de-energized to unlock the output of the level detector circuit by connecting the switch 170 to its ground position.

During the initial transient period when the level detector circuit is first energized for operation, its output may change state, falsely indicating an alarm condition. It is desirable to provide protective facilities in the level detector to prevent a false alarm indication. These protective facilities, if they are an integral part of the level detector, must function before the balance of the level detector is fully energized. In order to perform its assigned function, the protective facility must function to inhibit the generation of false outputs during transient energization of the level detector and permit the generation of output signals when energization of the level detector is complete.

The protective facility in the illustrative embodiment responds to the energization of the reference voltage source 20 to inhibit the output of the level detector and prevent false alarm signals. When the reference voltage source 20 is fully operative, the protective facility responds to the reference voltage to release the output of the level detector to permit the generation of alarm signals in response to an overvoltage.

The protective facility includes a driving circuit 30 coupled to the reference voltage source 20. The driving circuit 30 comprises a constant current field effect transistor 128 and a transistor 129. The transconductive path of transistor 128 and the collector-emitter path of transistor 129 shunt the avalanche breakdown diode 133 which generates the reference signal voltage as described above. The base electrode of the transistor 129 is coupled to a node common to the two series connected diodes 131 and 132 which couple the avalanche breakdown diode 133 to ground. The collector voltage of transistor 129 controls the transconductive state of transistor 130. The transistor 130 is coupled to the output stage of the level detector and in a conducting state inhibits the level detector output.

The principles of the protective facility may best be understood by examining the operation of the illustrative embodiment during the transient start-up period of the level detector. During the initial transient period when energy is applied to the level detector, the voltage level applied to the reference voltage source 20 is not sufficient in magnitude to cause a breakdown in the avalanche breakdown diode 133. The field effect transistor 128 draws the entire current supplied by the current source field effect transistor 101 since the avalanche breakdown diode 133 is not conducting. The conductive state of transistor 129 is controlled by the respective voltage drops established across the diodes 131 and 132. Since no current is transmitted by the avalanche breakdown diode 133, the voltage at the node common to diodes 131 and 132 is low and hence transistor 129 is biased into a nonconducting state. The constant current drawn by the field effect transistor 128 is applied, via lead 31, to the base of the transistor 130 whose collector-emitter path couples the base of the output transistor 122 to ground. The transistor 130 is biased into a high conducting state and transmits current away from the base of the transistor 122 to ground. With its base current diverted to ground, the transistor 122 is biased into a nonconducting state.

The value of the energizing DC voltage increases in magnitude until the avalanche breakdown diode 133 breaks down and conducts current. The forward voltage drop across the diodes 131 and 132 establishes a positive bias voltage to bias the transistor 129 into a conducting condition. The conducting transistor 129 draws the current output from the field effect transistor 128 and diverts this current from the base of the transistor 130. The transistor 130 is switched to a low conducting state and ceases to divert base current from the output transistor 122. The transistor 122 is now free to be biased into a conducting state in response to the output of the comparator 10. It is readily apparent that this arrangement to prevent false alarm signals from being generated during the initial energization of the level detector may advantageously be embodied as part of the integrated circuit of the detector.

What is claimed is:

1. A level detector circuit comprising a source of energy, means to compare the relative amplitude of two signals, means responsive to said means to compare to generate an output signal responsive to the relative magnitudes of the two signals, said responsive means including an output amplifier stage, means to generate a reference signal, said means to generate comprising a current source energized by said source of energy, an avalanche breakdown diode energized by said current source, a current drain coupled to said current source, a first semiconductor switch connected to control the bias of said output amplifier stage and responsive to the current output of said current drain, and a second semiconductor switch responsive to the breakdown of said avalanche breakdown diode to divert the current output of said current drain said first semiconductor switch, whereby the first semiconductor switch inhibits operation of said output amplifier stage by diverting bias current from the output stage and said second semiconductor switch turns off the first semiconductor switch after the avalanche breakdown diode breaks down.

2. A level detector circuit according to claim 1 further including an auxiliary input terminal arrangement to accept voltage of a polarity opposite the polarity of said energizing source, said auxiliary input terminal arrangement comprising a polarity inverter including means too derive a reference voltage from said constant current source and a voltage divider having one terminal coupled to said means to derive and adapted to accept a voltage of an opposite polarity at its other terminal and a tap to couple the voltage at a midpoint node on said voltage divider to an input of said means to compare.

3. A level detector comprising means to energize said level detector, signal comparison means, signal output means coupled to said signal comparison means and including a first source of constant current, a first variable current sink connected to said first source of current and responsive to said signal comparison means, and an output transistor driven by said first source of current, reference signal generation means coupled to an input of said signal comparison means, said reference signal generation means being coupled to said means to energize and comprising a second source of constant current, and a voltage breakdown diode connected to said second source of constant current to generate a fixed reference voltage therefrom, wherein the improvement comprises a third source of constant current connected to derive its current from said second source of constant current and responsive thereto, a second variable current sink having a control electrode connected to and energized by said third source of constant current and its main current path connected to a junction of said first source of constant current and said output transistor in order to divert driving current therefrom and a third variable current sink responsive to the breakdown of said voltage breakdown diode and having its main current path connected to the junction of said third source of constant current and the control electrode of said second variable current sink, whereby upon initial energization of the level detector the second variable current sink driven by said third constant current source diverts driving current from said output transistor and prevents it from being biased into conduction and said third variable current sink when operative disables said second variable current sink and permits said output transistor to be biased into conduction.

4. A level detector as defined in claim 3 further including voltage control means responsive to said reference signal generation means, a voltage divider coupled to said voltage control means and including input means to accept input signals of a polarity opposite said energizing signal and a tap to derive an input voltage of a polarity the same as said energizing signal, said tap being coupled to the input of said signal comparison means.

* * * * *